(12) United States Patent
Makino et al.

(10) Patent No.: US 6,522,849 B2
(45) Date of Patent: Feb. 18, 2003

(54) ROTATION STABILIZING DEVICE INCLUDING INERTIA MEMBER CONNECTED TO ROTARY CENTER AXIS OF A ROTARY MEMBER BY A VISCOELASTIC MEMBER

(75) Inventors: Toru Makino, Tokyo (JP); Chohiko Fukuo, Tokyo (JP); Jun Onishi, Tokyo (JP); Taku Saito, Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/884,589

(22) Filed: Jun. 19, 2001

(65) Prior Publication Data

US 2002/0001483 A1 Jan. 3, 2002

(30) Foreign Application Priority Data

Jun. 22, 2000 (JP) ........................................ 2000-187462

(51) Int. Cl.[7] ............................. G03G 15/00; H02K 5/24
(52) U.S. Cl. ........................ 399/159; 310/51; 399/167
(58) Field of Search ..................... 399/75, 159, 162, 399/167, 210, 116, 117; 74/572, 574; 310/74, 90, 51

(56) References Cited

U.S. PATENT DOCUMENTS

| | | | | |
|---|---|---|---|---|
| 4,563,605 A | * | 1/1986 | Gerber | 310/74 |
| 5,323,211 A | * | 6/1994 | Fujii et al. | 399/167 |
| 5,420,664 A | * | 5/1995 | Miwa et al. | 399/167 |
| 5,881,342 A | * | 3/1999 | Makino et al. | 399/167 |

FOREIGN PATENT DOCUMENTS

JP          61-009156          1/1986

* cited by examiner

*Primary Examiner*—Hoan Tran

(57) ABSTRACT

A rotation stabilizing device includes a rotary member rotated around a rotating center axis, an inertia member vibrating in accordance with a change of rotating speed of the rotary member, and a viscoelastic connector for detachably connecting the inertia member to the rotary member. The viscoelastic connector has viscosity and elasticity so as to change form in accordance with vibration of the inertia member. The inertia member is connected to at least one of an outer side and an inner side of the rotary member at a same phase in a direction of the rotating center axis of the rotary member by the viscoelastic connector.

20 Claims, 13 Drawing Sheets

ROTATION STABILIZING DEVICE INCLUDING INERTIA MEMBER CONNECTED TO ROTARY CENTER AXIS OF A ROTARY MEMBER BY A VISCOELASTIC MEMBER

BACKGROUND OF THE INVENTION

The present invention relates to a rotation stabilizing device that stabilizes rotation by inhibiting fluctuations of rotation, a rotation driving mechanism equipped with the rotation stabilizing device, an image forming apparatus wherein rotation fluctuations of an image carrier such as a photoreceptor drum can be inhibited, and to an image reading apparatus.

In recent years, there is a demand for stabilization of driving technologies in various technical fields. For example, there is known a technology to arrange a damper to stabilize driving of a motor that is used to drive a photoreceptor drum and a transfer belt both serving as an image carrier of an image forming apparatus such as a copying machine of an electrophotographic system and a printer. The photoreceptor drum of the image forming apparatus needs to be driven at a constant speed, and therefore, if speed fluctuations occur, image quality is deteriorated. The speed fluctuations are caused by fluctuations of a load applied on the image carrier, and the load fluctuations are not always regular in terms of their size and cycle. It has been impossible, therefore, to change a driving force for the image carrier by predicting load fluctuations.

Without being limited to the image forming apparatus, various technologies have been employed to stabilize driving of a rotating object. For example, it is known that a damper is arranged to achieve stabilization for driving a motor. In TOKKAISHO No. 61-9156, a damper is disclosed for a stepping motor wherein a flange portion fixed on the motor shaft is united with an inertia object through an elastic member.

In this conventional example, however, it is not possible to change a position, the number and a material of the elastic member, nor the dimensions and materials of the flange portion and the inertia object, because the inertia object is fixed to the flange portion and to the inertia object by means of adhesive agents or through a method of baking, resulting in a damper that is not versatile and has a low degree of freedom in use. Accordingly, it is impossible to replace the elastic member and the inertia object even when they have deteriorated, which requires an entire damper to be replaced. In this way, those having the conventional structure are not versatile, and other types need to be prepared in advance, which causes a cost increase.

SUMMARY OF THE INVENTION

An object of the invention is to provide a rotation stabilizing device that has versatility for use and a high degree of freedom and can inhibit rotation fluctuation and stabilize the rotation, and a rotation driving mechanism, an image forming apparatus as well as an image reading apparatus all having therein the rotation stabilizing device.

For attaining the object stated above, the rotation stabilizing device of the invention has therein a rotating member that rotates about a central axis for rotation, an inertia member arranged on at least one of an outer circumferential side and an inner circumferential side of the rotating member, and a combining member that is equipped with a visco-elastic member having viscosity and elasticity and combines the rotating member with the inertia member in a detachable manner through the visco-elastic member, wherein the combining member is mounted in a way that the combining member passes through the rotating member and the inertia member in the radial direction of the central axis for rotation.

In the case of the rotation stabilizing device wherein fluctuations of rotation speed of the rotating member are controlled by vibration of the inertia member and the visco-elastic member having viscosity and elasticity changes its shape in accordance with the vibration of the inertia member, even when vibratory force that causes fluctuations of rotation speed on the rotating member is generated, the fluctuations of rotation speed are controlled and the rotating member can rotate stably. Further, it is easy to replace the visco-elastic member, the rotating member and the inertia member, because the combining member combines the rotating member and the inertia member in a detachable manner, and various members can be combined freely to make adjustment for rotation stability to be easy, thus, the rotation stabilizing device which is versatile and has a high degree of freedom in use can be realized. Further, because of a simple structure, it is possible to realize a rotation stabilizing device that is low in cost and is durable in structure. It is further possible to construct the rotation stabilizing device that is compact in the axial direction, because it is possible to mount inertia members on the rotating member on the equal phase basis in the axial direction of the central axis for rotation.

Further, in the case that the inertia member is provided at an outer periphery side of the rotating member, the inertia member can be approached from a direction perpendicular to the shaft. Accordingly, it may become easy to conduct attaching/detaching or adjusting the inertia member from the direction perpendicular to the shaft. Further, by providing the inertia member at the outside of the rotating member, a relatively large inertia moment can be obtained easily with a relatively light inertia member, whereby it become possible to make the weight lighter and to refrain fluctuation in a rotating speed.

By providing a rotary shaft that is united with the rotating member fixed on the rotating member and rotates together with the rotating member, the rotary shaft can be connected to a rotary shaft of a motor, thus, it is possible to mount the rotation stabilizing device on the motor.

Further, when the combining member is provided with a connecting member that mounts the visco-elastic member on both the rotating member a nd the inertia member, it is easy to mount the visco-elastic member.

A flange portion formed to be solid with the visco-elastic member makes it possible for the connecting member to mount the visco-elastic member on the rotating member and on the inertia member. In this case, it is preferable to construct so that the flange portion of the connecting member may be interposed between the rotating member and the inertia member.

It is further possible for the connecting member to be supported by a supporting portion provided on at least one of the rotating member and the inertia member. In this case, it is preferable that the connecting member is screwed on or fitted with the supporting portion. It is further preferable that the connecting member is inserted into the through hole provided on the visco-elastic member and is supported by the supporting portion.

Further, it is preferable that the rotating member is constructed to be in a disk-like shape or in a cylindrical shape, and the inertia member is constructed to be in a disk-like shape or in a cylindrical shape. In this case, it is possible to construct so that the inertia member and the rotating member are arranged to be concentric each other. Incidentally, the disk-like shape in the present specification means a shape viewed on a plane that is perpendicular to the direction of the central axis for rotation, and it is represented by a flat shape.

It is further preferable that the mounting position for the combining member can be adjusted to the position selected optionally from a plurality of positions in the circumferential direction and a plurality of positions in the axial direction. The foregoing makes it possible for the mounting position of the combining member to be adjusted in accordance with the number of vibrations to be lowered, thus, it is possible to cope with the broader range of frequency and to realize a rotation stabilizing device which further stabilizes rotation.

By providing a plurality of holes through which the visco-elastic member is mounted on either one of the rotating member and the inertia member, the mounting position can simply be adjusted. In this case, it is preferable that holes in the circumferential direction are provided at positions arranged at regular intervals. It is further preferable to arrange a plurality of combining members.

The rotation driving mechanism of the invention is provided with a rotating member that rotates on a central axis for rotation, an inertia member arranged on at least one of an outer circumferential side and an inner circumferential side of the rotating member, and a combining member that is equipped with a visco-elastic member having viscosity and elasticity and combines the rotating member with the inertia member in a detachable manner through the visco-elastic member, wherein the combining member is provided with a rotation stabilizing device that is mounted to pass through the rotating member and the inertia member in the radial direction of the central axis for rotation, a rotation driving means, a rotary shaft that is rotated together with the rotating member by the rotation driving means and a rotation transmission mechanism connected with the rotary shaft.

In the rotation driving mechanism, fluctuations of rotation speed of the rotating member are controlled by vibration of the inertia member, and the visco-elastic member having viscosity and elasticity changes its shape in accordance with the vibration of the inertia member, thus, even when vibratory force that causes fluctuations of rotation speed on the rotation driving means is generated, the fluctuations of rotation speed are controlled and the rotating member of the rotation stabilizing device can rotate stably, resulting in stable rotation of the rotary shaft and transmission of stable rotation from the rotary shaft. Further, it is easy to replace the visco-elastic member, the rotating member and the inertia member, and various members can be combined freely, because the combining member of the rotation stabilizing device combines the rotating member and the inertia member in a detachable manner. It is further possible to construct the rotation driving mechanism on a compact basis in the axial direction because inertia members can be mounted on the rotating member on the equal phase basis in the axial direction of the central axis for rotation.

In this case, it is preferable that the rotation stabilizing device is further provided with a rotary shaft on the rotation stabilizing device side that is rotated together with the rotating member fixed on the rotating member and is connected to the rotary shaft.

It is further possible to arrange so that the rotation driving means is equipped with a rotary drum, and the rotating member of the rotation stabilizing device is constructed integrally with the rotary drum. In this case, an inertia member is combined with the rotary drum such as a rotor of the motor through the visco-elastic member.

Further, the rotation transmission mechanism may be provided with a timing belt pulley connected with the rotary shaft, a timing belt that engages with the timing belt pulley and with a timing belt pulley that engages with the timing belt provided on a driven portion. The rotation transmission mechanism may also be provided with a first gear connected with the rotary shaft and a second gear that is provided on the driven portion and engages with the first gear. Incidentally, in this case, the pulley and the gear may also be constructed to be integrated solidly with the rotating member of the rotation stabilizing device.

An image forming apparatus of the invention is provided with a rotating object which is equipped with an image carrier that carries an image formed by an image forming means, an inertia member arranged on the outer circumferential side of the rotating object and a combining member that is equipped with a visco-elastic member having viscosity and elasticity and combines the inertia member with the rotating object through the visco-elastic member on a detachable manner, and wherein the combining member is mounted to pass through the rotating member and the inertia member in the radial direction of the rotating object.

The image forming apparatus wherein an inertia member is mounted on a rotating object such as a photoreceptor drum through a visco-elastic member makes it possible to inhibit rotation fluctuations of an image carrier with a simple structure, and to stabilize rotation for obtaining excellent image quality. Further, an inertia member provided on an outer circumferential side of a rotating object makes the structure to be compact in the axial direction of the rotary shaft, which contributes to space saving of the image forming apparatus.

Further, for example, by providing a rotation driving mechanism equipped with the above-mentioned rotation stabilizing device is provided on a photoreceptor drum serving as an image carrier of an image forming apparatus, a transfer belt, a transfer drum or a cleaning unit, or on an image reading section of an image reading apparatus, it is possible to inhibit rotation fluctuations through the simple structure and to stabilize the rotation. By virtue of this, excellent image forming or image reading can be made possible, and excellent image quality can be obtained.

DETAILED DESCRIPTION OF THE PREFERRED EMBODIMENT

An embodiment of the invention will be explained as follows, referring to the following drawings. Each of FIGS. 1(a) and 1(b) is a diagram showing an example of a rotation stabilizing device related to the embodiment.

Figure 1:
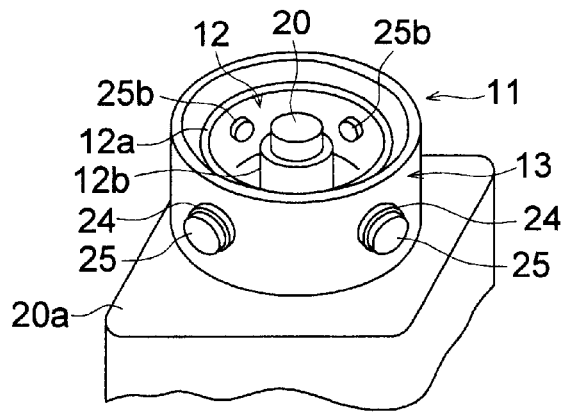
FIG. 1(a) is a perspective view.
FIG. 1(b) is a top view.
FIG. 1(c) is a front view, all of the rotation stabilizing device in the present embodiment.
Figure 1:
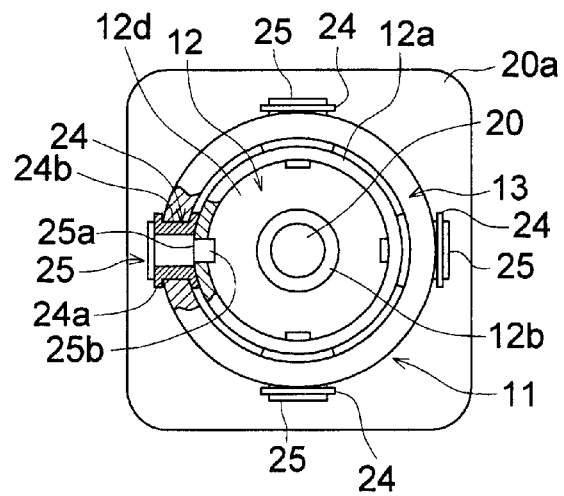
Figure 1:
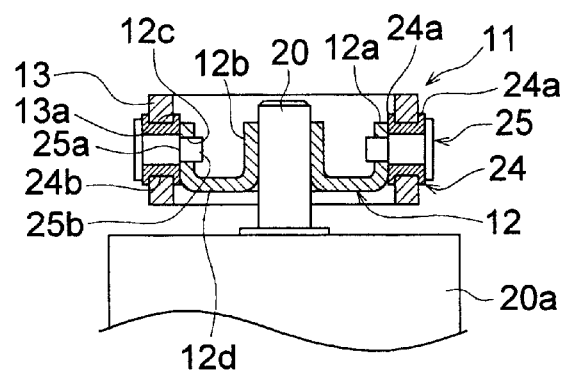

As shown in FIG. 1, rotation stabilizing device 11 is provided with rotating member 12, inertia member 13, visco-elastic member 24, and connecting member 25. The rotating member 12 is provided with rotary shaft 12b serving as a rotation center, circular plane 12a which is located to be away from the rotary shaft 12b to face it, coupling section 12d which couples rotating shaft 12b and circular plane 12a, and a plurality of female screws 12c which are arranged in the circumferential direction of the circular plane 12a, and, is formed totally to be in a form of a cylinder whose outer circumferential surface is circular plane 12a. The inertia member 13 is provided with a plurality of holes 13a corresponding to a plurality of female screws 12c which are arranged in a form of a concentric circle on the outer side of the circular plane 12a of the rotating member 12, and is formed totally to be in a cylindrical form. The visco-elastic member 24 is a combining member which combines the rotating member 12 and the inertia member 13.

Figure 2:
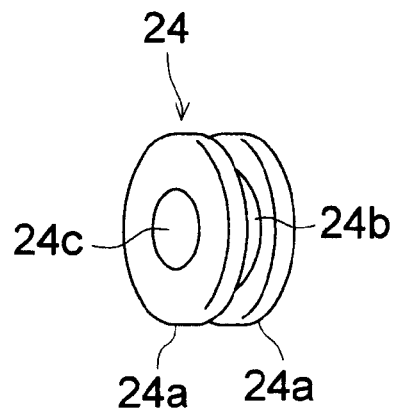
FIG. 2 is a perspective view of the visco-elastic member of the rotation stabilizing device shown in FIG. 1.

As shown in FIG. 2, the visco-elastic member 24 is made of a material having elasticity and viscosity to be solid as a whole, and is provided with flange sections 24a at its both ends, small diameter section 24b which is formed between the flange sections 24a and 24a, and through hole 24c formed at the center. Further, connecting member 25 is provided with screw section 25b which is inserted into through hole 24c of the visco-elastic member 24 and is engaged with female screw holes 12c of the rotating member 12, and with stepped section 25a on its middle portion.

Incidentally, elasticity represents properties to be free from a strain and to return to an initial shape, when stress is eliminated by removing load applied. Viscosity represents properties wherein, when one layer of fluid is moved against the other layer relatively, internal friction is caused along a boundary surface between the layers as a result of bond force and cohesive force, to resist a flow of fluid.

As shown in FIGS. 1(a) and 1(b), in rotation stabilizing device 11, the inertia member 13 is positioned between the flange sections 24a and the other 24a, after the visco-elastic member 24 is elastically deformed to be inserted into each hole 13a of the inertia member 13, and the deformation is restored, and the connecting member 25 is inserted into the through hole 24c of the visco-elastic member 24 from the outer circumference side of the inertia member 13, after small diameter section 24b is allowed to face an inner circular surface of each hole 13a, and thereby, the connecting member 25 is screwed in female screw 12c of the rotating member 12. In consequence of this, the rotating member 12 and the inertia member 13 are connected by the visco-elastic members 24. In this case, the stepped section 25a exists on the connecting member 25, and it comes in contact with the surface of the rotation member 12, thus the connecting member 25 holds the visco-elastic member 24 between the flange sections 24a and the other 24a at a constant distance, resulting in prevention of needless deformation caused by compression.

As mentioned above, in the rotation stabilizing device 11, the rotating member 12 is arranged on the inner circumferential surface of the inertia member 13, and the rotating member 12 and the inertia member 13 are connected to each other through the visco-elastic members 24 by the connecting member 25 that passes through in the radial direction of rotary shaft 12b. By loosening the screws of the connecting member 25, the rotating member 12 can easily be removed from the inertia member 13, and the visco-elastic member 24 is also removed easily through elastic deformation from each hole 13 of the inertia member 13. A material having higher rigidity than that of the visco-elastic member is desirable for the connecting member 25.

Further, the small diameter section 24b of the visco-elastic member 24 stays comparatively loosely in the inner surface of each of the holes 13a and 13c to be capable of rotating the visco-elastic member 24 in each of the holes 13a and 13c.

A diameter and a length of the visco-elastic member 24 can be determined to reduce specific frequency, and its shape can be not only cylindrical but also cubic. For example, a grommet can be used.

Still further, with regard to the quality of the material having the above-mentioned elasticity and viscosity, a material having the optimal attenuation characteristic for the frequency of the vibration to be reduced and tan δ that is not less than 0.05 is desirable. For such kinds of materials, there are natural rubber and synthetic rubber. For example, there are available NBR (acrylonitrile-butadiene rubber), IIR (butyl rubber), silicone rubber, and EPDM (ethylene propylene non-conjugated diethane), to which, however, the invention is not limited. With regard to rubber hardness, those ranging from 20° to 70° are preferable.

For a material of the rotating member 12, metals such as iron, aluminum, and brass, and resins such as POM and ABS, can be used, and sheet metal products, sintered products, machined products, and resin-molded products which are made of these materials are used as the rotating member 12. However, the invention is not limited to these materials and production methods.

For the inertia member 13, the same material as that for the rotating member 12 can be used, but it is preferable that at least one of the inertia member 13 and the rotating member 12 is made of metal, and it is more preferable that both of them are made of metal.

In the rotation stabilizing device 11 mentioned above, the rotary shaft 20 of motor 20a is fitted in the rotating shaft 12b of the rotating member 12 to be coupled as shown in FIG.

1. By the rotation of the rotating shaft 20 of this motor, the rotating member 12 of the rotation stabilizing device 11 is rotated together with inertia member 13, and the fluctuation of rotating speed of the rotating member 12 is controlled by the vibration of the inertia member 13 in the rotation, and the visco-elastic member 24 is deformed according to the vibration of the inertia member 13. Therefore, even when a vibratory force is generated by the motor to allow the rotating member 12 to cause the fluctuation of the rotating speed, the fluctuation of the rotating speed is controlled, and the rotating member 12 can rotate stably. As a consequence, the rotary shaft 20 can rotate stably while its vibration is controlled.

Further, since the inertia member 13 can be mounted on the rotating member 12 in equal phase in the axial direction of the central axis of rotation, it becomes possible to compose compactly in the axial direction, and also becomes advantageous when the rotation stabilizing device is installed on the equipment or apparatus for which space saving is required.

Since the visco-elastic member 24 and the connecting member 25 both serving as a combining member combine the rotating member 12 and the inertia member 13 detachably, the visco-elasting member 24, the rotating member 12 and the inertia member 13 are easily replaced, members 12, 13 and 24 are freely combined, an adjustment for stabilization of the rotation becomes easier, and in consequence, the rotation stabilization device with flexibility and higher degree of freedom for use can be realized. Since the visco-elastic member, the rotating member, and the inertia member of the rotation stabilizing device are easily recombined as mentioned above, cost reduction for a trial product and optimization of degree of freedom for design and vibration reducing design are attainable at low cost, which is favorable. As mentioned above, the structure of the rotation stabilizing device is so simple, strong, and highly durable that the stabilized efficiency can be obtained for a long period.

Figure 3:
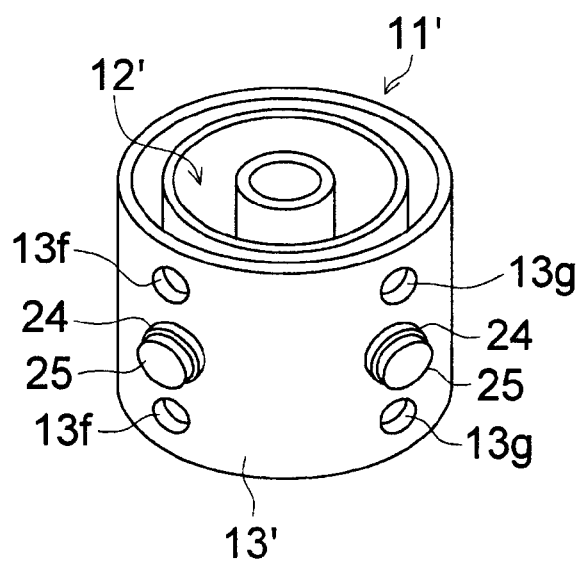
FIG. 3 is a perspective view showing a variation of the rotation stabilizing device shown in FIG. 1.

The variation of the embodiment of FIG. 1 will be explained as follows, referring to FIG. 3. Rotating member 12' and inertia member 13' of rotation stabilizing device 11' shown in FIG. 3, are constructed to be longer in the axial direction than those shown in FIG. 1, and there are formed in the axial direction a plurality of holes 13f and 13g through which the visco-elastic members are mounted by the connecting members 25. As mentioned above, since the visco-elastic member 24 can be arranged and mounted in any hole, selected optionally from a plurality of the holes arranged in the circumferential direction and in the axial direction, it becomes possible to adjust in accordance with the frequency to be reduced which is generated by the motor, and thereby to realize a rotation stabilizing device which can cope with a broader range of frequencies and can further stabilize the rotation. Accordingly, though there are various frequencies to be reduced for the motor or the unit, only the parts of the combining member (visco-elastic member) are can cope with the frequencies, and the cost of the parts can be reduced.

When the visco-elastic member is made of the rubber material, the scope of the acceptable frequencies can be extended, by changing the rubber hardness from the range of about 20–70 degrees. Thus, the degree of freedom for design for natural frequency is improved and the motors and the units can be selected from the wider range.

Figure 4:
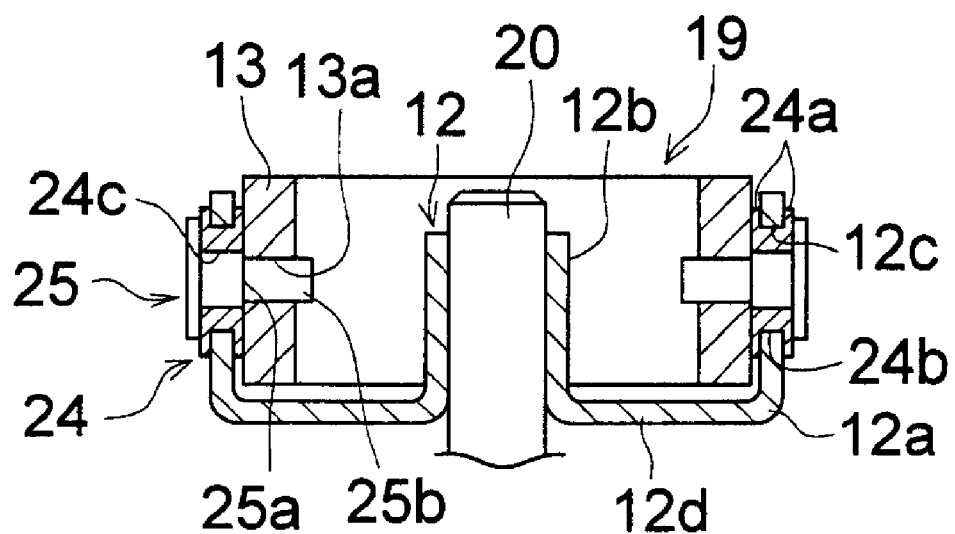
FIG. 4 is a perspective view showing another variation of the rotation stabilizing device shown in FIG. 1.

Another variation of the embodiment of FIG. 1 will be explained as follows, referring to FIG. 4. In rotation stabilizing device 19 shown in FIG. 4, inertia member 13 is arranged in the inside of the circumferential surface 12a of the rotating member 12 in FIG. 1, visco-elastic member 24 is mounted in hole 12c of circumferential surface 12a, and female hole 13a is formed on the inertia member 13. The connecting member 25 is screwed to the female screw 13a from the outer circumferential side of the circumferential surface 12a of the rotating member 12 through the through hole 24c of the visco-elastic member 24. Rotation stabilizing device 19 shown in FIG. 4 makes it possible to obtain the similar effects as in FIG. 1.

Figure 5A:
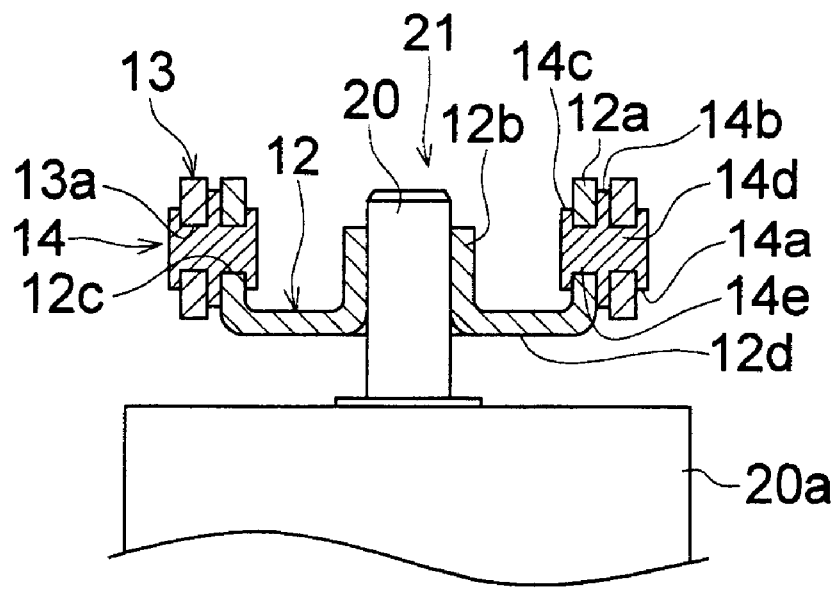
FIG. 5(a) is a front view of another rotation stabilizing device in the present embodiment.
Figure 5B:
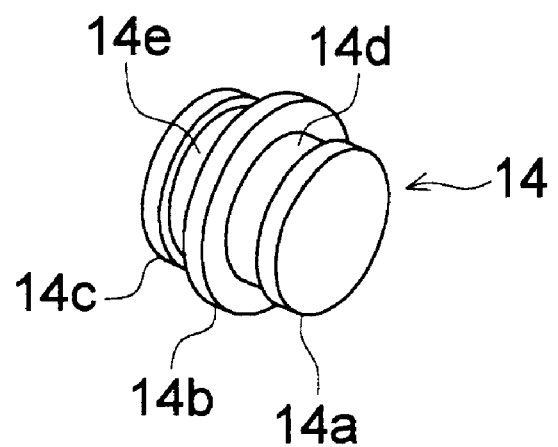
FIG. 5(b) is a perspective view of a combining member, of this embodiment.

Another rotation stabilizing device 21 is explained by the use of FIGS. 5(a) and 5(b). As the construction of this rotation stabilizing device is similar to that shown in FIG. 1, except that the combining member 14 serves as both the visco-elastic member and the connecting member, same parts are given the same symbols, and explanation for them will be omitted.

As shown in FIG. 5(b), the combining member 14 is made of a viscous and elastic material to be cylindrical solidly as a whole, and it is provided with a plurality of flange sections 14a, 14b, and 14c, small diameter section 14d positioned between flange section 14a and 14b, and small diameter section 14e positioned between flange section 14b and 14c, and it combines the rotating member 12 and the inertia member 13.

In the rotation stabilizing device 21 shown in FIG. 5(a), a plurality of the combining members 14 are elastic, and after each of them is inserted respectively into each hole 12c of the rotating member 12 and each hole 13a of the inertia member 13, with their flange sections 14a, 14b, and 14c deformed elastically, and after the elastic deformation is restored, the inertia member 13 is positioned between the flange sections 14a and 14b, the small diameter section 14d is positioned to face the inner circumferential surface of each hole 13a of the inertia member 13, and on the other hand, the circumferential surface 12a of the rotating member 12 is positioned to be interposed between the flange sections 14b and 14c, and the small diameter sections 14e is positioned to face the inner circumferential surface of each hole 12c of the rotating member 12.

As mentioned above, the combining member 14 serves as both the visco-elastic member and the connecting member, and it is mounted on both the rotating member 12 and the inertia member 13, through the elastic deformation of the flange sections 14a, 14b and 14c and restoration thereof, to combine them through the visco-elastic member. Further, the combining member 14 can be removed, through its elastic deformation, from the holes 12a and 12c of the rotating member 12, and from holes 13a and 13c of the inertia member 13.

In this case, the contact between the flange sections 14a and 14b of the combining member 14 and the inertia member 13, and the contact between the flange sections 14b and 14c and the rotating member 12 are relatively close, while, the small diameter sections 14d and 14e of the combining member 14 are positioned relatively loosely respectively in the inner circumferential surfaces of the holes 12a, 12c, 13a, and 13c. Each combining member 14 is allowed to rotate in each of the holes 12a, 12c, 13a, and 13c.

According to the above-mentioned rotation stabilizing device 21, the rotary shaft 12b of the rotating member 12 is connected to the rotary shaft 20 of the motor 20a as shown in FIG. 5(a), and the same effect as that shown in FIG. 1 can be obtained.

Figure 6:
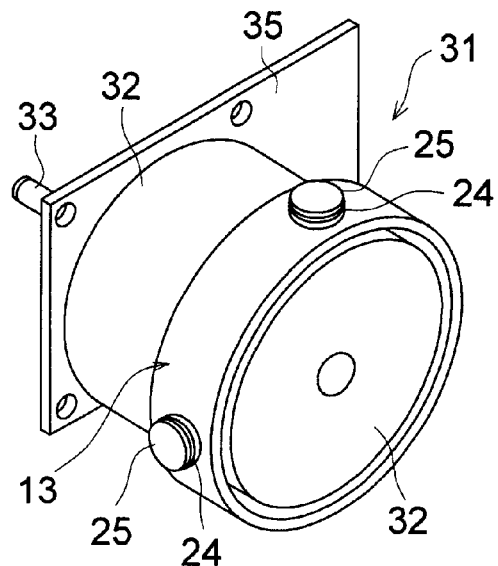
FIG. 6(a) is a perspective view of another rotation stabilizing device in the present embodiment.
FIG. 6(b) is a sectional view, thereof viewed in the direction perpendicular to the direction of the rotary shaft.
Figure 6:
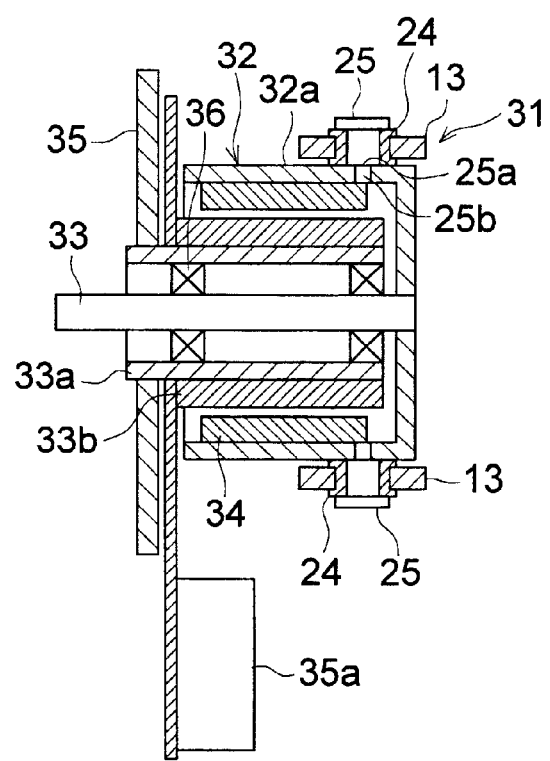

Another rotation stabilizing device 31 will be explained as follows, referring to FIGS. 6(a) and 6(b). This rotation stabilizing device 31 uses the inertia member, the visco-elastic member, and the connecting member which are the same as those in FIG. 1, however, the rotating member is not provided with the rotary shaft, in particular. That is, the rotating member is rotor 32, which constitutes a DC outer rotor motor, and inertia member 13 is screwed on the outer circumferential surface 32a of the rotor 32 by connecting member 25 through visco-elastic member 24, in the same way as in FIG. 1.

The rotary shaft 33 is rotatable through bearing 36 of cylindrical section 33a that is united solidly with motor mounting plate 35, and it is connected with rotor 32 to rotate integrally. When coil 33b on the outer circumferential surface of the cylindrical section 33a is energized from motor electric circuit board 35a, even when vibratory force causing fluctuation in rotating speed is caused on the motor when rotor 32 and rotary shaft 33 are rotated by the operation of magnet 34 on the inner circumferential surface of rotor 32, the fluctuation of rotating speed is controlled by the rotation stabilizing device 31, and the rotor 32 and the rotary shaft 33 can rotate stably, resulting in obtaining of the same effect as in FIG. 1. Especially, though the DC motor is apt to fluctuate in its rotating speed with a cogging effect at a low rotating speed area, this construction can absorb the fluctuation of the rotating speed, and stable rotating speed can be obtained even in the case of low rotating speed. In particular, it is more effective that the frequency of the cogging component is made to agree with the natural frequency of rotation stabilizing device 31.

Incidentally, a fly wheel of a fixed type can also be used additionally in the above-mentioned rotation stabilizing device. It is also possible to compose the rotating member with the viscous and elastic materials. Furthermore, it is also possible to construct so that a visco-elastic member may be united solidly with the rotating member made of a visco-elastic material.

Figure 8:
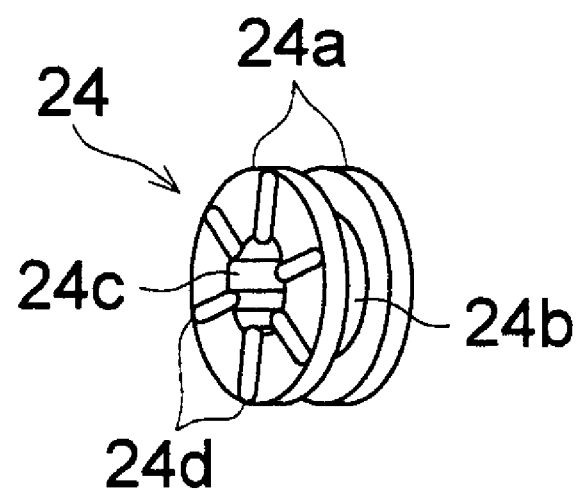
FIG. 8 is a perspective view showing a variation of the viscoelastic member shown in FIG. 2.

Next, FIG. 8 shows an example of the variation of the visco-elastic member which can be used in FIGS. 1, 3, 4, and 6. The visco-elastic member 24' is one wherein a plurality of linear small projections 24d each being present continuously from the surface of the flange section 24a to the inner circumferential surface of the through hole 24c are provided. Small projection 24d is extending radially in the radius direction on the flange section 24a, while extending straight and longitudinally in the inner circumferential surface of the through hole 24c. By changing heights or the number of small projections 24c, it is possible to adjust the attenuation characteristic of the vibration.

Figure 7:
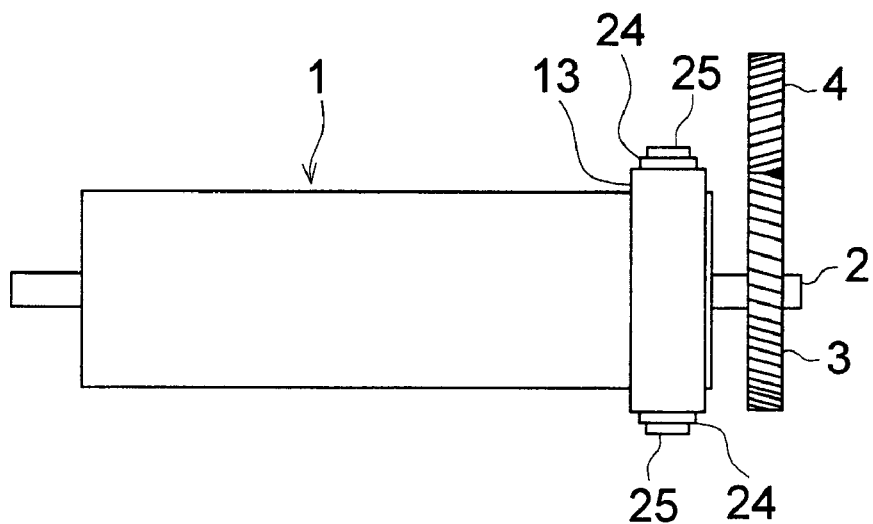
FIG. 7(a) is a front view of the photoreceptor drum of an image forming apparatus in the present embodiment.
FIG. 7(b) is a sectional view thereof viewed in the direction perpendicular to the direction of the rotary shaft.
Figure 7:
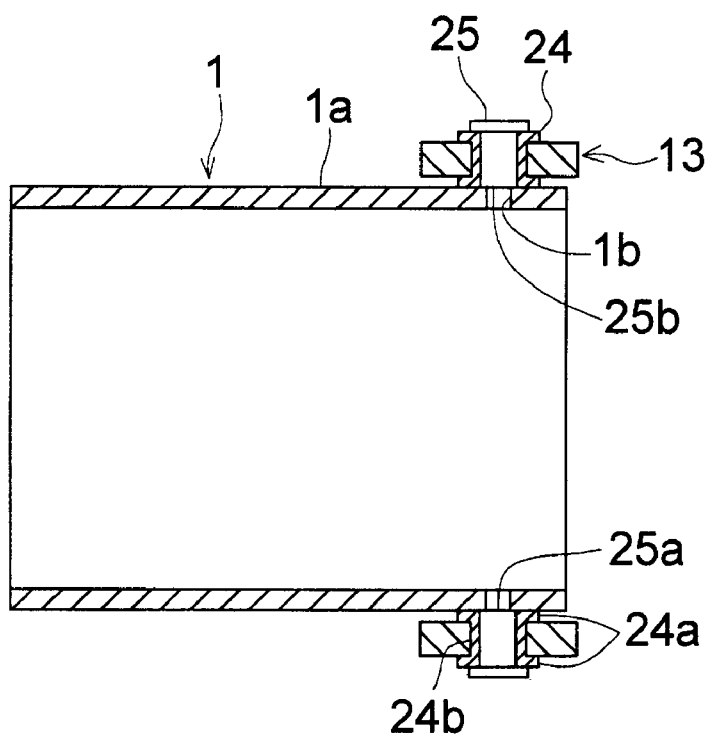

Next, FIGS. 7(a) and 7(b) explain the example wherein an inertia member is mounted on photoreceptor drum 1 of an image forming apparatus of an electrophotographic system. In FIG. 7, the photoreceptor drum 1 representing an image carrier which carries a latent image, is mounted on rotary shaft 2 to be capable solidly with the rotary shaft 2, and the rotary shaft 2 is held rotatably by an unillustrated bearing. On the right side of the photoreceptor drum 1, gear 3 is mounted to rotate integrally with the rotary shaft 2. The gear 3 meshes with gear 4, and receives a rotation torque from an unillustrated motor, through gear 4.

Inertia member 13 is mounted on the right side of photoreceptor drum 1, as shown in FIG. 7(b). That is, on outer circumferential surface 1a of the photoreceptor drum 1, there are provided a plurality of female screws 1b at plural positions in the circumferential direction, and the inertia member 13 is mounted on the photoreceptor drum 1 by the visco-elastic member 24 and the connecting member 25, which are the same as those in FIG. 1.

In the image forming apparatus of this embodiment, during a single turn of the photoreceptor drum 1, it successively conducts the following actions, wherein electrical charges coming from an unillustrated charging unit (image forming means) are accumulated, toner is attracted to the outer circumferential surface, the toner is transferred on a sheet, and remaining toner is removed from the photoreceptor drum by a scraping blade (not illustrated) or a fur brush, before succeeding electrical charges are accumulated.

As mentioned above, when the photoreceptor drum 1 is rotated by the motive power from a motor (not illustrated) through the gears 3 and 4, the drum is vibrated by the resistance of the scrapping blade or the fur brush, and resonance of torsional vibration is generated in the rotary shaft 2, and the fluctuation of load is also generated. According to the construction of this embodiment, however, speed fluctuations are controlled by the action of the inertia member 13 and the visco-elastic member 24 as described above, and the rotation of the photoreceptor drum 1 is stabilized. Accordingly, an image quality of a latent image which is formed on the photoreceptor drum 1 during the rotation thereof can be improved. Since outer circumferential surface 1a of the photoreceptor drum 1 is provided with the inertia member 13, this construction becomes compact in the axial direction of the rotary shaft 2, resulting in contribution to space saving of an image forming apparatus.

Next, the rotation driving mechanism having rotation stabilizing device that is nearly the same as that shown in FIG. 1 will be explained as follows, referring to FIGS. 9(a) and 9(b). The rotation driving mechanism shown in FIG. 9(a) is provided with rotation stabilizing device 41, motor 42, rotary shaft 43 of the motor, timing belt pulley 44 which is fixed on one end 43a of the rotary shaft 43 of the motor 42, and timing belt 45 which engages with the timing belt pulley 44.

The rotation driving mechanism is composed of the timing belt 45 which engages with the timing belt pulley 44, and another timing belt pulley (not illustrated) which is mounted on the driven section. Since the rotation stabilizing device 41 stabilizes the rotation of the rotary shaft 43 of the motor 42, the rotation in the driven section transmitted by the rotation transmission mechanism is stabilized.

Figure 9:
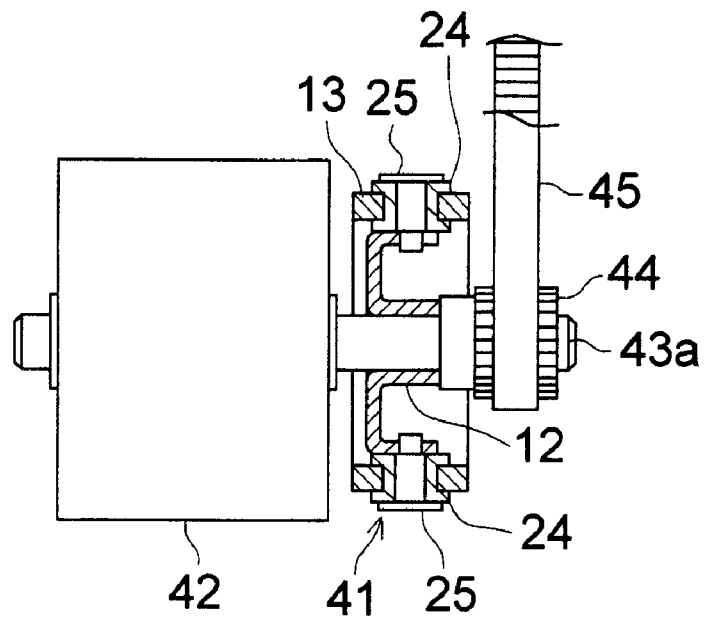
FIG. 9(a) is a side view of the rotation driving mechanism having the driving pulley and the belt of the present embodiment.
FIG. 9(b) is a side view showing another example.
Figure 9:
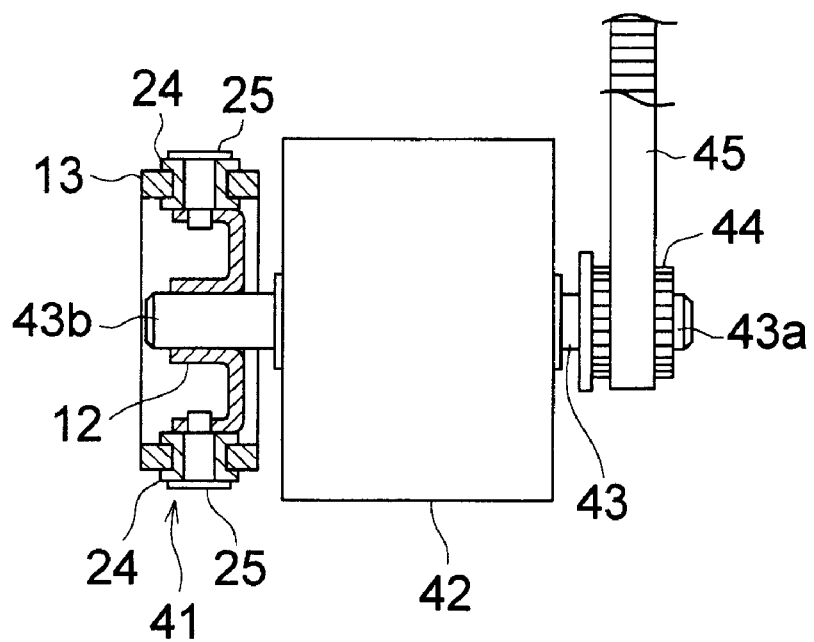

In FIG. 9(a), by integrating the pulley 44 solidly with rotating member 12 of the rotation stabilizing device 41, the construction can be simplified, the numbers of the parts can be reduced and the cost reduction is also possible.

The rotation driving mechanism shown in FIG. 9(b) is one wherein the timing belt pulley 44 is fixed on one end 43a of the rotary shaft 43 of the motor 42, and the rotation stabilizing device 41 is mounted on the other end 43b of the rotary shaft 43. This makes it possible to obtain the same effects as in FIG. 5(a).

Figure 10:
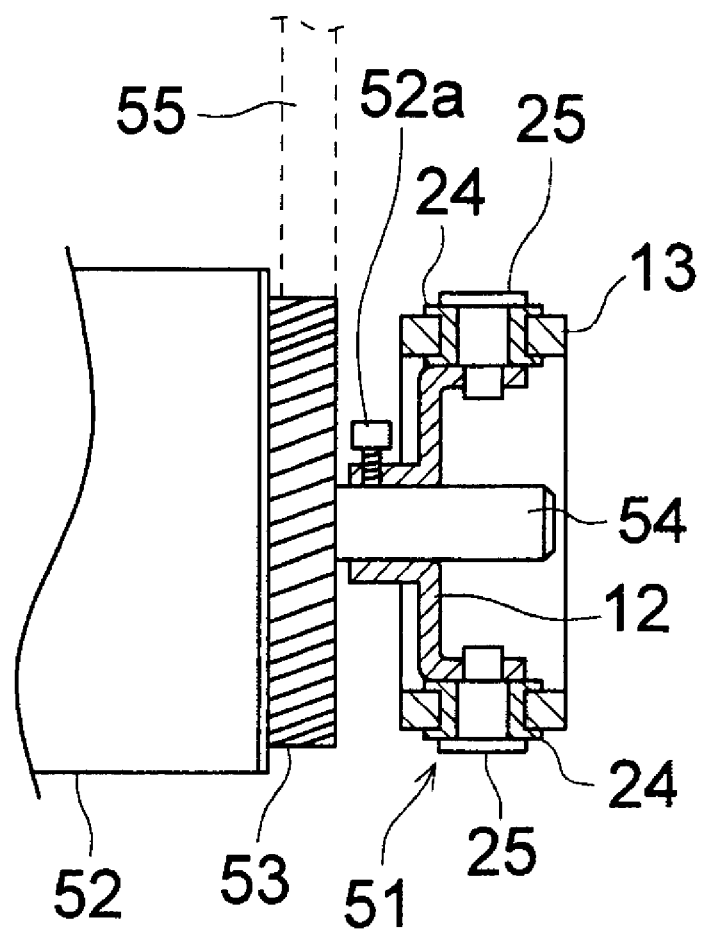
FIG. 10 is a side view showing the rotation driving mechanism having the driving gears of the present embodiment.

Next, FIG. 10 explains another rotation driving mechanism. The example in FIG. 10 is one wherein first gear 53, which is fixed on rotary shaft 54 of motor 52, drives second gear 55 which is shown by broken lines. The rotation stabilizing device, nearly the same as that in FIG. 1, is fixed on the rotary shaft 54 by screw 52a, with rotary shaft 12b of its rotating member 12 being fitted with the rotary shaft 54. Since the rotation of the rotary shaft 54 of the motor 52 is stabilized by the rotation stabilizing device 51, the rotation of the driven section, transferred by a gear mechanism which is the rotation transmission mechanism, is stabilized.

Figure 11:
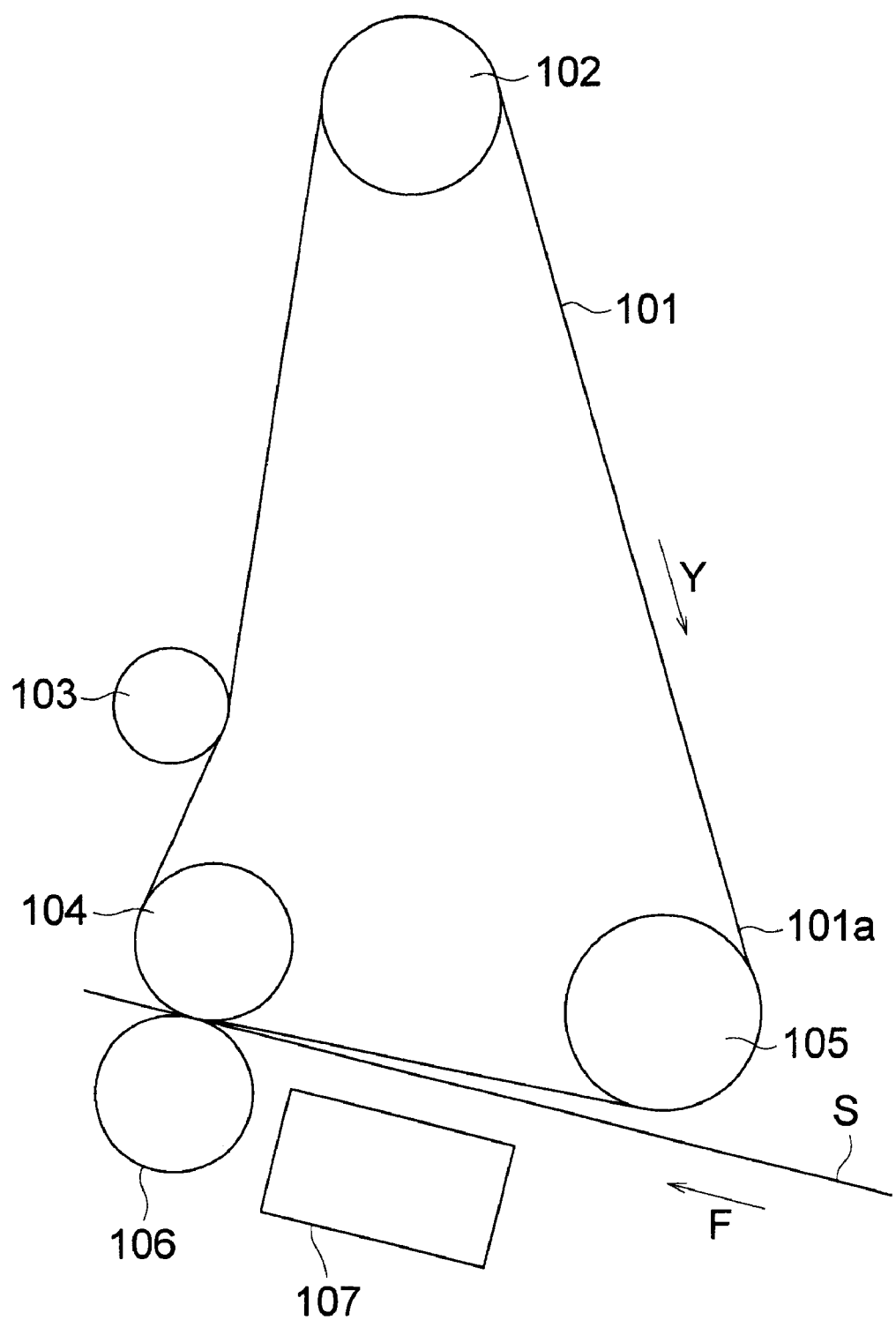
FIG. 11 is a diagram showing the structure of the transfer belt and its neighborhood of the image forming apparatus of the present embodiment.
Figure 12:
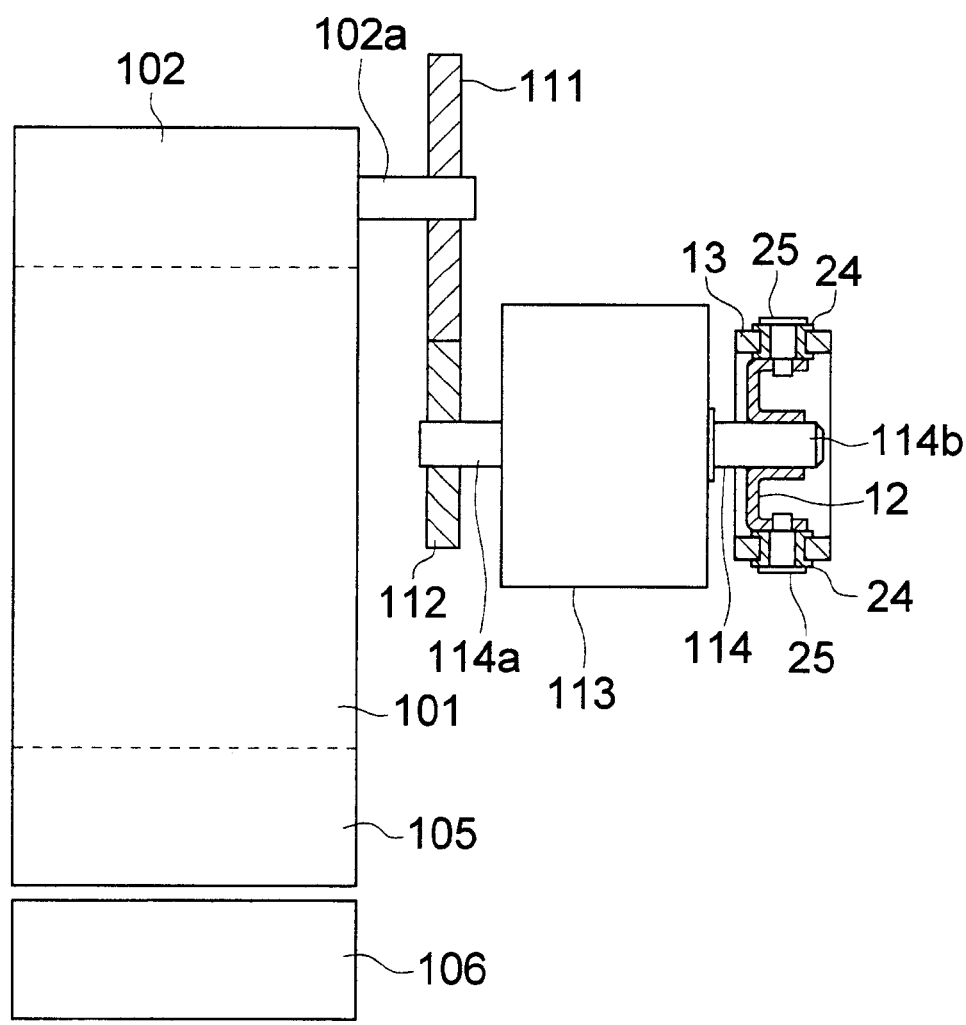
FIG. 12 is a diagram showing the rotation driving mechanism of the transfer belt shown in FIG. 11.

FIG. 11 and FIG. 12 explain an example wherein the rotation driving mechanism for a transfer belt of an image forming apparatus is provided with the above-mentioned rotation stabilizing device. As shown in FIG. 11, an transfer belt 101 representing a belt-shaped image carrier of an image forming apparatus is composed of a photoreceptor, and an image formed on surface 101a of the transfer belt 101 is transferred by image transfer device 107 onto transfer sheet S which is fed in the direction of F. While the transfer belt 101 is moved by the rotation driving of driving roller 102 in the direction of Y on the rotation rollers 103, 104, and 105, transfer sheet S is conveyed in the direction of F between rotation roller 106 and rotation roller 104.

As shown in FIG. 12, the rotary shaft 102a of the rotation driving roller 102 which drives the transfer belt 101 to rotate is driven to rotate by the motor 113 through gear 111 and gear 112. Gear 113 is connected to one end 114a of the rotary shaft 114 of motor 113, while rotation stabilizing device 115 same as that in FIG. 1 is connected to the other end 114b.

When the rotation driving roller 102 is rotated by the rotation of the motor 113 through the rotary shaft 114, the gears 112, 111, and the rotary shaft 102a, even if the vibratory force that causes fluctuation of rotating speed of the motor 113 is generated, the fluctuation of the rotating speed is controlled by the action of the rotation stabilizing device 115, and the rotary shaft 114 can rotate stably with its vibration controlled, and thereby, the rotation of the rotation driving roller 102 becomes stable. Therefore, the transfer belt 101 can move at the stable and constant speed in the Y direction. Accordingly, the transfer device 107 can transfer the image stably and firmly from the transfer belt 101 to the transfer sheet S, and it becomes possible to form the image of higher quality.

As mentioned above, since the image forming apparatus provided with the rotation stabilizing device in this embodiment can obtain excellent image quality without using the complicated control, there is no need to use expensive circuits or motors, and it is possible to contribute to the cost reduction, because the structure requires less parts.

In the past, the fluctuation of rotating speed of the image carriers, such as the photoreceptor drum or the transfer belt, of the image forming apparatus has caused deterioration of the image quality. This is caused by the fluctuation of the load applied on these image carriers, and it has been impossible to change the driving power for the image carrier by predicting the load fluctuation, because this fluctuation of the load is not always regular in terms of size and time. However, the rotation stabilizing device of this invention can control the rate fluctuation caused by the load fluctuation, and can stabilize the rotation, therefore, the problems stated above can be solved.

Figure 13:
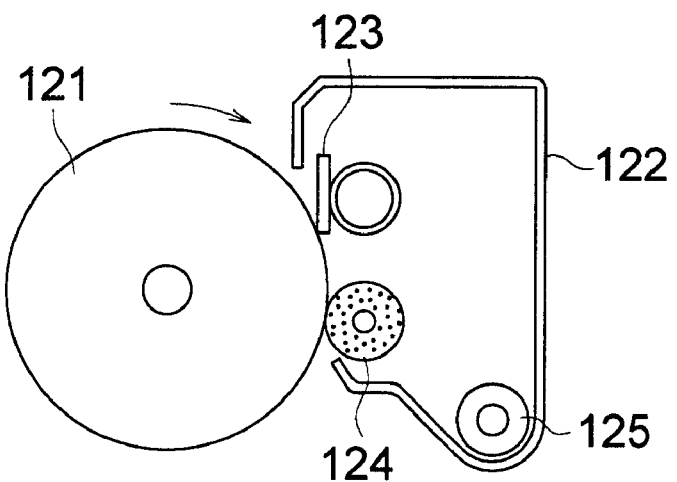
FIG. 13(a) is a side view of a photoreceptor drum and a cleaning unit in an image forming apparatus in the present embodiment.
FIG. 13(b) is a top view of the cleaning unit thereof.
Figure 13:
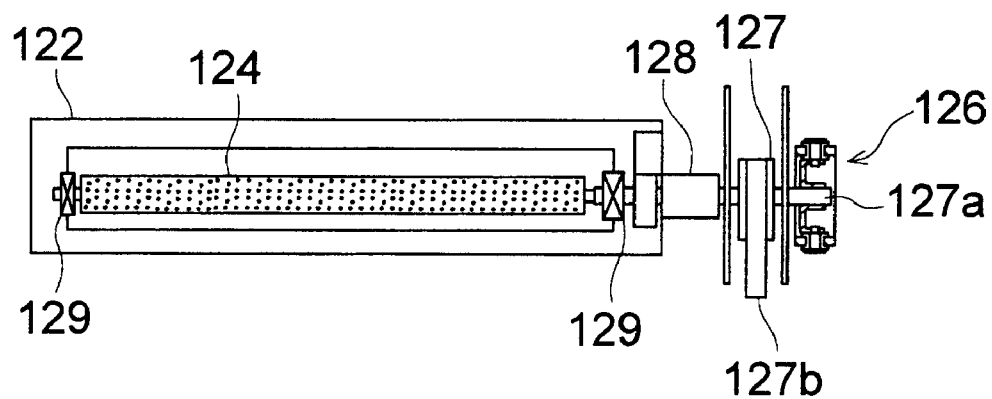

FIGS. 13(a) and 13(b) explain an example wherein the rotation stabilizing device that is the same as that described above is provided on a fur brush cleaning unit having the rotation driving mechanism in the image forming apparatus. As shown in FIG. 13(a), in the neighborhood of the photoreceptor drum 121 of the image forming apparatus of an electrophotographic system, there is arranged cleaner unit 122 that removes toner remaining on the photoreceptor drum 121 for succeeding image forming, after a latent image formed on the photoreceptor drum 121 is developed with toner. This cleaner unit 122 is provided with cleaning blade 123 which scrapes off the remaining toner from the photoreceptor drum 121 which is rotating in the direction of an arrow, fur brush 124 which auxiliarily cleans the photoreceptor drum 121 by touching it at the downstream side of the cleaning blade 123, and toner conveying screw 125 which conveys the scraped toner to the outside of the cleaner unit 122.

As shown in FIG. 13(b), the fur brush 124 whose rotary shaft is rotatably held at its both ends by bearings 129 is connected to rotary shaft 127a of driving pulley 127 through POM coupling 128, and is driven to rotate by the driving pulley 127. The driving pulley 127 is driven to rotate by the driving motor (not illustrated) through belt 127b, and its rotary shaft 127a is connected to the rotation stabilizing device 126 shown in FIG. 1. In this example, the rotation stabilizing device is not provided on the driving motor side, but is provided on the side of the rotary shaft 127a of the driving pulley 127 connected to the rotary shaft of the fur brush 124, and the rotation of the rotary shaft of the fur brush 124 can still be stabilized in the same way as in the foregoing, even though speed fluctuation are caused on the rotary shaft 127a.

Since the fur brush 124 is in contact with the photoreceptor drum 121, and has the peripheral rate that is the same as or different from that of the photoreceptor drum 121, when rate fluctuations are caused on the fur brush, they are transferred to the photoreceptor drum 121, and the rate fluctuations are caused on the photoreceptor drum 121, resulting in the cause of image unevenness. In the present example, however, the rate fluctuations of the fur brush 124 can be prevented by mounting the rotation stabilizing device on the side of the rotary shaft of the fur brush 124 as stated above, thus, rate fluctuations of the photoreceptor drum 121 can be prevented, image unevenness is not caused and high image quality can be realized, which is preferable. Incidentally, it is a matter of course that the rotation stabilizing device is mounted on the side of the driving motor of the driving pulley 127.

Figure 14:
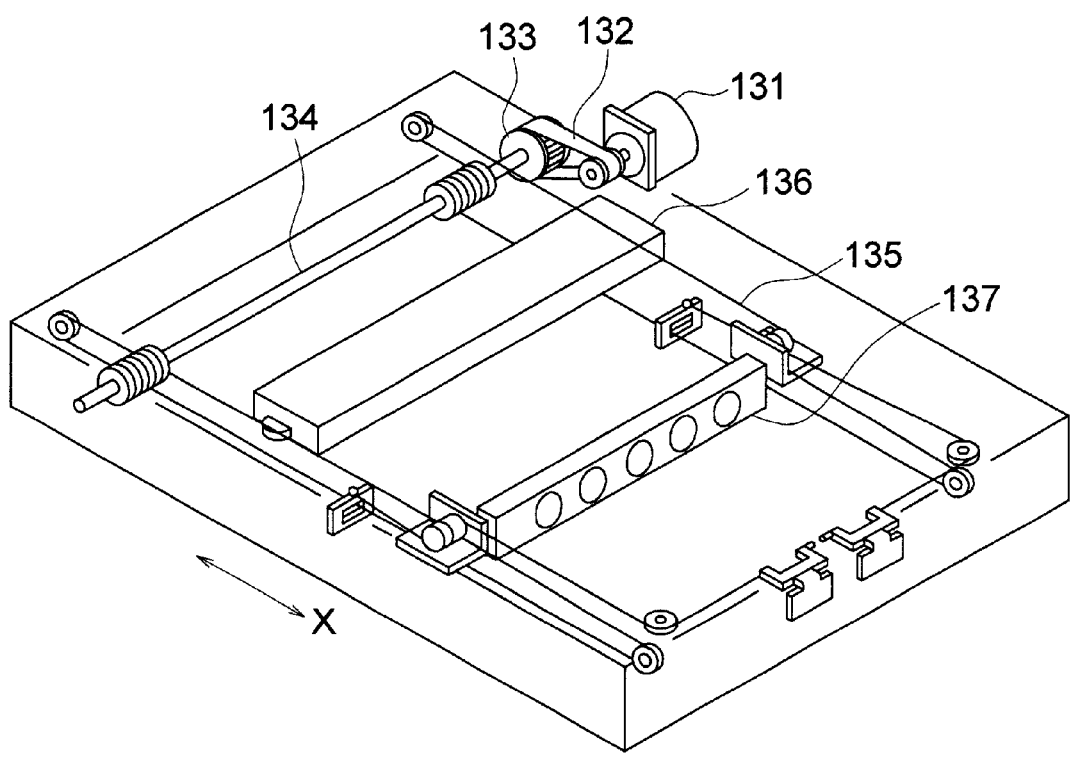
FIG. 14 is a perspective view schematically showing the image reading apparatus of the present embodiment.

FIG. 14 explains an example wherein there is used a rotation driving mechanism which uses a stepping motor as a motor in FIG. 9(a) or 9(b), for example, in an image reading apparatus. The image reading apparatus shown in the drawing is provided with stepping motor 131 on which the rotation stabilizing device same as one shown in FIG. 9(b) is provided, driving pulley 133 which is driven by motor 131 through timing belt 132 to drive rotary shaft 134 to rotate, wire 135 which is stretched on the circumference of the apparatus and is driven by the rotation of the rotary shaft 134, and with exposure unit 136 and V mirror unit 137 which include optical system, such as a light source and mirrors, and are driven in the X direction through driving of the wire 135 to expose a document to light for reading images from the document.

Since the stepping motor 131 is provided with the rotation stabilizing device, the rotation of the stepping motor 131 is stabilized, even though the rate fluctuations are caused in the rotation, and movement of the exposure unit 136 and the V mirror unit 137 conducted by the wire 135 are stabilized, resulting in realization of the image reading at the higher accuracy, which is preferable. Still further, since the viscoelastic member 24 can be arranged in any hole, conforming to the frequency to be reduced in the stepping motor 131 in the rotation stabilizing device in the same way as in FIG. 2, the vibration can be reduced more effectively, and the rotation is further stabilized, which is preferable.

According to this invention, it is possible to provide a rotation stabilizing device which has flexibility and high degree of freedom in use, and can control rotation fluctuations to stabilize rotation, and a rotation driving mechanism, an image forming apparatus and an image reading apparatus, all of which are provided with this rotation stabilizing device.

What is claimed is:

1. A rotation stabilizing device comprising:
a rotary member rotated around a rotating center axis;
an inertia member vibrating in accordance with change of rotating speed of the rotary member; and
a viscoelastic connector for detachably connecting the inertia member to the rotary member, wherein the viscoelastic connector has viscosity and elasticity so as to change form in accordance with vibration of the inertia member;
wherein the inertia member is connected to at least one of an outer side and an inner side of the rotary member at a same phase in a direction of the rotating center axis of the rotary member by the viscoelastic connector.

2. The rotation stabilizing device of claim 1, wherein the rotary member has a rotation axis as the rotating center axis.

3. The rotation stabilizing device of claim 1, wherein the viscoelastic connector has a flange nipped between the rotary member and the inertia member.

4. The rotation stabilizing device of claim 1, wherein the viscoelastic connector comprises a viscoelastic member and an attaching member, wherein the rotary member and the inertia member are connected by the attaching member through the viscoelastic member.

5. The rotation stabilizing device of claim 4, wherein one of the rotary member and the inertia member has a supporting member to which the attaching member is detachably screwed or fitted.

6. The rotation stabilizing device of claim 1, wherein the shape of the rotary member is a disk or a cylinder.

7. The rotation stabilizing device of claim 6, wherein the shape of the inertia member is a disk or a cylinder, and wherein the rotary member and the inertia member are arranged on a concentric circle.

8. The rotation stabilizing device of claim 7 further comprising a plurality of attaching positions for attaching the viscoelastic connector in a direction of a circumference of the rotary member or the inertia member so as to adjust an attaching position of the viscoelastic connector.

9. The rotation stabilizing device of claim 7 further comprising a plurality of attaching positions for attaching the viscoelastic connector in a direction of the rotating center axis of the rotary member or the inertia member so as to adjust an attaching position of the viscoelastic connector.

10. The rotation stabilizing device of claim 1 further comprising a plurality of viscoelastic connectors.

11. A rotation stabilizing device comprising:
a rotary member rotated around a rotation axis;
an inertia member vibrating in accordance with a change of rotating speed of the rotary member; and
a plurality of viscoelastic connectors penetrating the rotary member and the inertia member in a direction of a radius of the rotary member for detachably attaching the inertia member to the rotary member, wherein the viscoelastic connectors have viscosity and elasticity so as to change form in accordance with vibration of the inertia member;
wherein the inertia member is connected to at least one of an outer side and an.inner side of the rotary member at a same phase in a direction of the rotation axis by the viscoelastic connectors.

12. A rotation driving mechanism comprising:
a rotation axis;
a rotation driving device for rotating the rotation axis;
a rotary member rotated around the rotation axis;
an inertia member vibrating in accordance with a change of rotating speed of the rotary member; and
a viscoelastic connector for detachably connecting the inertia member to the rotary member, wherein the viscoelastic connector has viscosity and elasticity so as to change form in accordance with vibration of the inertia member;
wherein the inertia member is connected to at least one of an outer side and an inner side of the rotary member at a same phase in a direction of the rotation axis by the viscoelastic connector.

13. The rotation driving mechanism of claim 12, wherein the rotary member is a rotary drum.

14. The rotation driving mechanism of claim 12 further comprising:
a first toothed pulley connected with the rotation axis;
a toothed belt engaging with the first toothed pulley; and
a second toothed pulley engaging with the toothed belt for communicating driving force to an external device.

15. The rotation driving mechanism of claim 12 further comprising:
a first gear connected with the rotation axis; and
a second gear engaging with the first gear for communicating a driving force to an external device.

16. An image forming apparatus comprising:
an image forming device having a rotatable member; and
a rotation driving mechanism to rotate the rotatable member of the image forming device, the rotation driving mechanism including:
a rotation axis;
a rotation driving device for rotating the rotation axis;
a rotary member rotated around the rotation axis and operatively coupled to the rotatable member of the image forming device;
an inertia member vibrating in accordance with a change of rotating speed of the rotary member; and
a viscoelastic connector for detachably connecting the inertia member to the rotary member, wherein the viscoelastic connector has viscosity and elasticity so as to change form in accordance with vibration of the inertia member;
wherein the inertia member is connected to at least one of an outer side and an inner side of the rotary member at a same phase in a direction of the rotation axis of the rotary member by the viscoelastic connector.

17. The image forming apparatus of claim 16, wherein the rotatable member is an image carrier for carrying an image.

18. The image forming apparatus of claim 16, wherein the image forming device further comprises:
an image carrier for carrying an image; and
a fur brush cleaning roller connected with the rotation axis for cleaning an outer surface of the image carrier.

19. An image reading apparatus comprising:
an image forming device having a rotatable member; and
a rotation driving mechanism to rotate the rotatable member of the image forming device, the rotation driving mechanism including:
a rotation axis;
a rotation driving device for rotating the rotation axis;
a rotary member rotated around the rotation axis connected with the rotatable member of the image forming device;

an inertia member vibrating in accordance with change of rotating speed of the rotary member; and a viscoelastic connector for detachably connecting the inertia member to the rotary member, wherein the viscoelastic connector has viscosity and elasticity so as to change form in accordance with vibration of the inertia member;

wherein the inertia member is connected to at least one of an outer side and an inner side of the rotary member at a same phase in a direction of the rotation axis of the rotary member by the viscoelastic connector.

20. The image reading apparatus of claim 19 further comprising an exposing mirror driven by rotating of the rotation axis.

* * * * *